Patented Nov. 11, 1952

2,617,811

UNITED STATES PATENT OFFICE 2,617,811

INHIBITING PEROXIDATION OF TETRA-HYDROFURFURYL ALCOHOL

David Gwyn Jones and Charles Thomson Young Cowie, Norton-on-Tees, England, assignors to Imperial Chemical Industries Limited, a corporation of Great Britain No Drawing. Application February 26, 1951, Serial No. 212,842. In Great Britain March 20, 1950

9 Claims. (Cl. 260—345)

This invention relates to inhibiting peroxidation of tetrahydrofurfuryl alcohol.

In our co-pending U. S. Application No. 131,245 we have described and claimed means for, and a process of, inhibiting peroxidation of cyclic ethers or their alkyl substituted derivatives.

We have now found that tetrahydrofurfuryl alcohol is liable to undergo peroxidation under normal storage conditions, which is undesirable for a variety of reasons. Thus, the peroxide will decompose on heating and this results in the formation of undesirable degradation products, some of which, being acidic, may react with the container in which the tetrahydrofurfuryl alcohol is later stored, giving rise to discoloration. These impurities may also interfere with the subsequent use of tetrahydrofurfuryl alcohol as a solvent. On storage, some of the peroxide formed may even decompose at room temperature.

It has been pointed out in the specification of the parent application that, while para-cresol and hydroquinone are both established as inhibitors of peroxidation of furan compounds, 2,4-dimethyl-6-tertiary butyl phenol and similar 2,4,6-tri-alkyl phenols are superior to hydroquinone in that the materials do not become discoloured. It is to be added that these tri-alkylated phenols also confer a higher degree of stabilisation.

We have now found that 2,4-dimethyl-6-tertiary butyl phenol and similar 2,4-dimethyl-6-alkyl phenols, where the alkyl group contains up to 8 carbon atoms, are superior, in these respects, to hydroquinone for the stabilisation of tetrahydrofurfuryl alcohol.

Experiments were carried out as follows to establish the efficiency of 2,4-dimethyl-6-tertiary butyl phenol in stabilising tetrahydrofurfuryl alcohol.

50 ml. portions of tetrahydrofurfuryl alcohol, freed from peroxides and purified by vacuum distillation in an atmosphere of carbon dioxide, were exposed in glass vessels of similar design to daylight and to the atmosphere at room temperature in the absence of inhibitor and in the presence of 0.02 and 0.1% by weight of 2,4-dimethyl-6-tertiary butyl phenol. The peroxide oxygen content of the samples was determined at intervals. The results given in Table I show the efficiency of 2,4-dimethyl-6-tertiary butyl phenol as an inhibitor. In addition it was noted that the samples containing 2,4-dimethyl-6-tertiary butyl phenol were colourless, whereas samples containing hydroquinone began to form colour even after 22 days, and after 36 days were brownish-yellow.

Table I

| Time (days) | Periodic Oxygen Content (gm./gm.×10$^6$) | | |
|---|---|---|---|
| | Uninhibited | 0.02% 2,4-dimethyl-6-tertiary butyl phenol | 0.1% 2,4-dimethyl-6-tertiary butyl phenol |
| 0 | Nil | Nil | Nil |
| 16 | 113 | Nil | Nil |
| 22 | 228 | Nil | Nil |
| 30 | 486 | Nil | Nil |
| 36 | 628 | 15 | Nil |
| 43 | 990 | 13 | Nil |
| 57 | 1,549 | | Nil |
| 75 | 2,499 | 27 | Nil |
| 82 | 3,073 | 33 | Nil |

Under similar conditions, a number of di- and tri-alkylated phenols were compared regarding their efficacy as peroxidation inhibitors for tetrahydrofurfuryl alcohol. In each case 0.02% by weight of the inhibitor were added. The results are listed in Table II

| Inhibitor | Peroxidic Oxygen Content (gm./gm.×10$^6$) after 28 days |
|---|---|
| Blank | 1,439 |
| 2,4,6-trimethyl phenol | 256 |
| 2,4-dimethyl-6-tertiary butyl phenol | 033 |
| 2,4-dimethyl-6-$\alpha,\alpha,\gamma,\gamma$, tetramethyl butyl phenol | 124 |
| 2,4-dimethyl phenol | 417 |
| 2,6-dimethyl phenol | 1,633 |
| 2,5-dimethyl phenol | 1,528 |
| 2,5-dimethyl-4-tertiary butyl phenol | 1,660 |
| 3-methyl-4,6-di-tertiary butyl phenol | 1,421 |
| 4-methyl-2,6-di-tertiary butyl phenol | 1,596 |
| 2-methyl, 4,6-di-tertiary butyl phenol | 1,123 |
| 2,3,5-trimethyl phenol | 1,871 |
| 2,4,6-tri-tertiary butyl phenol | 1,121 |

None of the inhibitors in Table II discoloured the tetrahydrofurfuryl alcohol, but it is seen that the 2,4-dimethyl-6-alkyl phenols have a greatly superior inhibiting effect over the other di- and tri-alkylated phenols examined.

Satisfactory results are obtained by providing between 0.01 and 1.0% by weight of the inhibitor in the tetrahydrofurfuryl alcohol; an amount of 0.02 to 0.1% is preferred.

We claim:

1. A new, undiscolored composition of matter which comprises tetrahydrofurfuryl alcohol and, as an inhibitor of peroxidation, at least one 2,4-dimethyl-6-alkyl phenol wherein the "alkyl" group contains up to 8 carbon atoms.

2. A new, undiscolored composition of matter as claimed in claim 1 in which there is present between 0.01 and 1.0% by weight of at least one tri-alkylated phenol of the stated kind.

3. A new, undiscolored composition of matter as claimed in claim 1 in which there is present between 0.02 and 0.1% by weight of at least one tri-alkylated phenol of the stated kind.

4. A new, undiscolored composition of matter which comprises tetrahydrofurfuryl alcohol and, as an inhibitor of peroxidation, 2,4,6-trimethyl phenol.

5. A new, undiscolored composition of matter which comprises tetrahydrofurfuryl alcohol and, as an inhibitor of peroxidation, 2,4-dimethyl-6-tertiary butyl phenol.

6. A new, undiscolored composition of matter which comprises tetrahydrofurfuryl alcohol and, as an inhibitor of peroxidation, 2,4-dimethyl-$a,a,\beta,\beta$-tetramethyl butyl phenol.

7. A process of inhibiting peroxidation of tetrahydrofurfuryl alcohol which comprises providing, together with said alcohol, a small amount of at least one 2,4-dimethyl-6-alkyl phenol wherein the "alkyl" group contains up to 8 carbon atoms.

8. A process as claimed in claim 7 which comprises providing tri-alkylated phenol in an amount chosen from the range between 0.01 and 1% by weight.

9. A process as claimed in claim 7 which comprises providing tri-alkylated phenol in an amount chosen from the range between 0.02 and 0.1% by weight.

DAVID GWYN JONES.
CHARLES THOMSON YOUNG COWIE.

REFERENCES CITED

The following references are of record in the file of this patent:

UNITED STATES PATENTS

| Number | Name | Date |
|---|---|---|
| 2,080,142 | Lowry | May 11, 1937 |
| 2,248,828 | Stevens | July 8, 1941 |
| 2,462,426 | Reiff | Feb. 22, 1949 |
| 2,489,260 | Bordner | Nov. 29, 1949 |
| 2,525,410 | Hinegardner | Oct. 10, 1950 |
| 2,561,667 | Klein | July 24, 1951 |